US006673877B2

(12) United States Patent
Paar et al.

(10) Patent No.: US 6,673,877 B2
(45) Date of Patent: Jan. 6, 2004

(54) PRODUCT A'ABC OF EPOXY RESINS A' AND PRODUCT OF POLYEPOXIDES A, FATTY ACIDS B AND AMINES C

(75) Inventors: Willibald Paar, Graz (AT); Manfred Krassnitzer, Graz (AT); Maximilian Friedl, Gratkorn (AT); Roland Feola, Graz (AT); Johann Gmoser, Graz (AT)

(73) Assignee: Solutia Austria GmbH, Werndorf (AT)

( * ) Notice: Subject to any disclaimer, the term of this patent is extended or adjusted under 35 U.S.C. 154(b) by 92 days.

(21) Appl. No.: 10/051,596

(22) Filed: Jan. 18, 2002

(65) Prior Publication Data

US 2002/0160202 A1 Oct. 31, 2002

(30) Foreign Application Priority Data

Feb. 20, 2001 (AT) .............................. 262/2001

(51) Int. Cl.$^7$ .................. C08G 59/14; C08G 59/16; C08L 63/00; C08L 63/02; C08L 63/10
(52) U.S. Cl. .................. 525/524; 523/404; 528/103
(58) Field of Search ................ 525/531, 533, 525/524; 523/404; 528/103

(56) References Cited

U.S. PATENT DOCUMENTS

| 4,358,551 A | 11/1982 | Shimp .................. 523/414 |
| 5,760,108 A * | 6/1998 | Arora et al. ............. 523/404 |
| 6,572,972 B2 * | 6/2003 | Paar et al. .................. 428/418 |

FOREIGN PATENT DOCUMENTS

| AT | 390 261 B | 4/1990 |
| EP | 0 814 137 A2 | 12/1997 |
| EP | 0 918 071 A1 | 5/1999 |
| JP | 11-124540 A * | 5/1999 |
| JP | 11-171969 A * | 6/1999 |
| JP | 2000 327744 | 11/2000 |
| JP | 2000-327744 A * | 11/2000 |

OTHER PUBLICATIONS

EP 0 741 156 = CA 2,175,531 Zoeller et al.., Nov. 6, 1996.
EP 0 059 487 = WO 92/09667 Holmberg, Jun. 11, 1992.
EP 0 312 733 Stephan et al., Apr. 26, 1989.
EP 0 444 454 = US 5,589,535 Schwab et al., Sep. 4, 1991.
EP 0 355 761 Zuckert, Feb. 28, 2002.
EP 0 316 732 Dhein et al., May 24, 1989.
EP 0 370 299 = US 5,089,342 Dhein et al., May 30, 1990.
EP 0 267 562 Zuckert et al., May 18, 1988.
EP 0 070 704 Shimp, Jan. 26, 1983.
AT 390 261 = US 4,996,250 Zuckert et al., Apr. 10, 1990.

* cited by examiner

Primary Examiner—Robert E. Sellers, II
(74) Attorney, Agent, or Firm—ProPat, L.L.C.

(57) ABSTRACT

Binders for aqueous corrosion protection systems, comprising products A'ABC of reaction of epoxy resins, fatty acids, and amines, having a number average molar mass $M_n$ of at least 5000 g/mol, obtained by reacting epoxide compounds A' containing at least two epoxide groups per molecule and reaction products ABC of epoxide compounds A, fatty acids B, and amines C, wherein, where appropriate, the epoxide compounds A' and/or the epoxide compounds A have been modified prior to further reaction, in whole or in part, by reaction with compounds D containing at least one acid group or hydroxyl group reactive toward epoxide groups, and wherein, where appropriate, the amines C have been modified prior to further reaction, in whole or in part, by reaction with aliphatic or aromatic monoepoxide compounds A" or mixtures thereof.

17 Claims, No Drawings

PRODUCT A'ABC OF EPOXY RESINS A' AND PRODUCT OF POLYEPOXIDES A, FATTY ACIDS B AND AMINES C

FIELD OF THE INVENTION

The invention relates to aqueous binders for corrosion protection systems which are oxidatively crosslinkable by atmospheric oxygen via their olefinic double bonds.

BACKGROUND OF THE INVENTION

Air drying resins or binders are known primarily in the field of alkyd resins; water dilutable alkyd resins are obtained by mixing (unmodified) alkyd resins with emulsifiers or by incorporation of a sufficient number of acid groups, which remain following the condensation reaction, and the neutralization of at least some of said groups, or cocondensation with hydrophilic polyoxy-alkylene polyols such as polyethylene glycol.

By way of example, hydroxy functional emulsifiers for alkyd resins based on polyurethane polyureas are known from EP-A 0 741 156. Other externally emulsified aqueous alkyd resin compositions are described in EP-A 0 593 487. Alkyd resins with chemically incorporated emulsifier (self-emulsifying) are known from EP-A 0 312 733.

Water compatibility is achieved in all cases by the use of nonionic or anionic emulsifiers, in chemically incorporated or added form.

It is also known to modify polyurethane resins by incorporating unsaturated fatty acids (EP-A 0 444 454) so that paints produced with them are air drying.

Epoxy functional resins which through modification with fatty acids lead to air drying binders are described in EP-A 0 355 761 (esters of fatty acids with epoxy resins), 0 316 732, 0 370 299 (acrylate resins with epoxide groups), and 0 267 562 (alkyd, urethane-alkyd or epoxide-ester resins grafted in an aqueous medium with olefinically unsaturated monomers).

Aqueous formulations of neutralized reaction products of epoxy resin-amine adducts and fatty acids are known from EP-A 0 070 704. There, amines and epoxy resins based on polyhydric phenols are used to prepare adducts having a molar mass of from 1000 to 3000 g/mol which are then reacted with unsaturated fatty acids to give a product in which the mass fraction of these fatty acids is from 25 to 50%. The amount of fatty acids is to be chosen so that all of the active amine hydrogen atoms are consumed.

AT-B 390 261 discloses emulsions of epoxy resin esters which can be used as binders for air drying paints. The resins are prepared by reacting epoxy resins, partially esterified with fatty acids, and copolymers of unsaturated fatty acids and (meth)acrylic acid, and further copolymerizable monomers, and to achieve water dilutability are at least partly neutralized using alkalis. These resins may also be admixed with amino functional epoxy resin esters.

SUMMARY OF THE INVENTION

It has now been found that reaction products of epoxy resins and fatty acid modified epoxide-amine adducts may be used as binders for air drying paints which afford excellent corrosion protection to metallic substrates.

The invention accordingly provides products A'ABC of reaction of epoxy resins, fatty acids, and amines, which are reaction products of epoxide compounds A' containing at least two epoxide groups per molecule and reaction products ABC of epoxide compounds A, fatty acids B, and amines C, and wherein their number average molar mass $M_n$ is at least 5000 g/mol, and, where appropriate, the epoxide compounds A' and/or the epoxide compounds A have been modified prior to further reaction, in whole or in part, by reaction with compounds D containing at least one acid group or hydroxyl group reactive toward epoxide groups, and, where appropriate, the amines C have been modified prior to further reaction, in whole or in part, by reaction with aliphatic or aromatic monoepoxide compounds A" or mixtures thereof.

DETAILED DESCRIPTION OF THE PREFERRED EMBODIMENTS

In particular, the molar mass calculated from the stoichiometry (number average molar mass), $M_n$, of these reaction products A'A B C is preferably at least 10000 g/mol, more preferably at least 15000 g/mol, and with particular preference at least 20000 g/mol, and their (measured) acid number is not more than 5 mg/g. Following at least partial neutralization of the amino groups, the reaction products are dispersible in water and form stable dispersions which do not form any sediment even after 4 weeks of storage at room temperature (20° C.).

The epoxy resins A and A' are selected independently of one another from diepoxide or polyepoxide compounds which are obtainable in a known manner by reacting epichlorohydrin with aromatic or (cyclo)aliphatic compounds containing two or more hydroxyl groups per molecule (Taffy process), or may be obtained by reacting diepoxides or polyepoxides with the aforementioned aromatic or (cyclo)aliphatic compounds containing two or more hydroxyl groups per molecule (advancement reaction). Preference is given to epoxy resins based on aromatic dihydroxy compounds, such as bisphenol A, bisphenol F, dihydroxydiphenyl sulfone, hydroquinone, resorcinol, 1,4-bis[2-(4-hydroxyphenyl)-2-propyl]benzene, or aliphatic dihydroxy compounds such as 1,6-hexanediol, 1,4-butanediol, cyclohexanedimethanol, or oligo- and poly-propylene glycol. The specific epoxide group content of the epoxy resins is preferably from 0.4 to 7 mol/kg, in particular from 0.6 to 6 mol/kg. In one preferred embodiment, diepoxide compounds are used in each case for A and A', the specific epoxide group contents being from 0.5 to 4 mol/kg in the case of A and from 2 to 5.9 mol/kg in the case of A'.

Particular preference is given to epoxy resins based on bisphenol A and bisphenol F and mixtures thereof.

The fatty acids B contain at least one olefinic double bond and have from 6 to 30, preferably from 8 to 26, and in particular from 16 to 22 carbon atoms. Preference is given to palmoleic acid, oleic acid, and erucic acid; linoleic acid, linolenic acid, and eleostearic acid, arachidonic acid, and clupanodonic acid, and also the fatty acids obtainable as mixtures from the naturally occurring oils, such as linseed oil fatty acid, conjuvandol fatty acid, tall oil fatty acid, cottonseed oil fatty acid, rapeseed oil fatty acid, and the fatty acid mixtures obtained from dehydrated castor oil.

The amines C are preferably aliphatic, linear, cyclic or branched amines which contain at least one primary or secondary amino group. They have preferably from 2 to 12 carbon atoms and may also contain tertiary amino groups and/or hydroxyl groups as functional groups. Particularly suitable are primary monoamines having from 6 to 12 carbon atoms such as hexylamine, cyclohexylamine, 2-ethylhexylamine, and stearylamine, primary-tertiary diamines such as dimethylaminopropylamine, diethylaminopropylamine, diprimary-secondary amines such as diethylenetriamine, triethylenetramine, and tetraethylenepentamine, and the mixtures of oligomeric diaminopolyethyleneimines available commercially as ®Polymin, and also secondary amines and diamines such as piperidine, piperazine, di-n-butylamine, morpholine, and hydroxy functional amines such as ethanolamine, diethanolamine, and diisopropanolamine. Mixtures of said amines may also be used.

It is possible to prepare the intermediates ABC by sequential reaction, in which case first the epoxide compounds A are reacted with the amines C and in a second step these adducts are reacted with the fatty acids B to give the intermediate A B C. It is, however, also possible first to react the epoxide compounds A with the fatty acids B and then to react the remaining epoxide groups with the amines C. It is likewise possible to perform the reaction simultaneously and so to obtain the intermediates ABC in one step. The amounts of the reactants A, B and C are chosen such that substantially all of the epoxide groups, i.e., at least 90%, preferably at least 95%, and in particular at least 98% of the epoxide groups originally present in A are reacted. Preferably, the reaction is also to be conducted such that the intermediate ABC no longer contains any reactive amine hydrogen atoms; at the most, however, the amount of amine hydrogen atoms may be 10 mmol/kg.

One variant of the present invention comprises, when using amines C containing more than two amine hydrogen atoms, consuming some of these amine hydrogen atoms by reaction with a monoepoxide A". Accordingly, a primary amino group containing two active amine hydrogen atoms becomes a secondary β-hydroxyamine group, or a secondary amino group becomes a tertiary β-hydroxyamine group. Suitable monoepoxides A" include any desired aliphatic or aromatic monoepoxides or mixtures thereof, especially glycidyl ethers of monohydric alcohols or phenols such as butyl glycidyl ether, 2-ethylhexyl glycidyl ether, phenyl glycidyl ether, and also glycidyl esters of monobasic acids, preferably aliphatic or aromatic carboxylic acids, such as glycidyl benzoate, glycidyl acetate, glycidyl stearate, and the glycidyl esters of α-branched aliphatic carboxylic acids, such as glycidyl 2-ethylhexanoate, glycidyl 2,2-dimethylpropionate, glycidyl 2,2-dimethyl-octanoate, glycidyl 2-methylnonanoate, especially technical grade mixtures of such branched aliphatic esters, which are available commercially as ®Cardura E5 ("glycidyl neopentanoate") or E10 ("glycidyl neo-decanoate") or ®Glydexx.

In accordance with this variant, the amines C are reduced in their functionality, in whole or in part, prior to the reaction with A or with A B, by the reaction with the monoepoxides A". These modified amines C' are subsequently reacted, alone or in a mixture with the unmodified amines C, in the further reaction with A or with A B (reaction in stages) or with A and B (conjoint reaction).

Within the bounds of the invention it is also possible to react the epoxy resins A before, during or after the reaction with the coreactants B and C, with further compounds D which possess at least one hydrogen atom that is reactive toward epoxide groups, i.e., alcohols, phenols, and acids, especially compounds containing activated hydroxyl groups and acid groups, which are selected preferably from aliphatic diols and polyols such as glycol, propanediol, neopentyl glycol, glycerol, trimethylolpropane, pentaerythritol, ditrimethylol-propane, and dipentaerythritol, (substituted) phenols such as phenol itself, the isomeric cresols and xylenols, and also polyhydric and/or polynuclear phenols such as resorcinol, dihydroxybiphenyl, dihydroxydiphenyl sulfone, bisphenol A, α- and β-naphthol, and 2,3- and 2,6-dihydroxynaphthalene, monobasic and polybasic carboxylic acids such as saturated aliphatic linear or branched carboxylic acids having from 2 to 40 carbon atoms such as isooctanoic acid, stearic acid, the dimeric fatty acids, aromatic carboxylic acids such as benzoic acid, isophthalic and terephthalic acid, sulfonic acids such as benzenesulfonic acid and sulfoisophthalic acid, phosphoric acid, and alkyl- and arylphosphonic acids such as methane- and benzene-phosphonic acid.

To prepare the reaction products A'A B C of the invention, the components are reacted preferably in the following amount of substance fractions:

per 1 mol of the epoxide compound A, from 0.1 to 1.0 mol, more preferably from 0.2 to 0.9 mol, and with particular preference from 0.25 to 0.8 mol of the fatty acids B and from 0.5 to 1.9 mol, more preferably from 0.6 to 1.75 mol, and with particular preference from 0.65 to 1.5 mol of the amines C in the first stage, and then in the second stage from 0.2 to 1.0 mol, more preferably from 0.25 to 0.9 mol, with particular preference from 0.3 to 0.8 mol, of the epoxide compound A' is reacted with the adduct from the first stage.

Where compounds D are used, their amount of substance fraction per 1 mol of the epoxide compound A is from 0.02 to 0.3 mol, preferably from 0.05 to 0.25 mol, and with particular preference from 0.1 to 0.2 mol. The compounds D may be used before the reaction with B and/or C to modify the epoxide compounds; it is also possible to use them together with components B and/or C.

Where monoepoxide compounds A" are used to modify the amines C, their amount of substance is to be chosen such that the amines C' still possess on average at least one reactive amine hydrogen atom per molecule.

Where the epoxide compounds A and/or A' or the amines C are replaced in whole or in part by these modified compounds in accordance with the two preceding paragraphs, then in each case the mixture or the modified compound is to be used instead of A, A' and C.

The preparation of the reaction products A'A B C takes place by reacting components A, B and C, preferably in a solvent which is inert under the reaction conditions, at a temperature of from 70 to 150° C., the concentration (mass fraction) of components A, B and C (and also, where used, D) in the solution being from 30 to 85%, preferably from 50 to 80%. As solvent it is preferred to use ether alcohols (alkoxyalkanols having from 3 to 10 carbon atoms) such as methoxypropanol, isopropyl glycol, butyl glycol, and 3-methoxy-1-butanol. After the end of the reaction (complete consumption of the epoxide groups), the solution of the adduct ABC is neutralized by adding organic or inorganic acids to a degree of neutralization (percentage fraction of tertiary amino groups which have been converted into the salt form, based on their overall amount) of from 20 to 100%, preferably from 30 to 90%, and in particular from 50 to 85%, and the (partly) neutralized solution of the adduct is diluted with water to a mass fraction of solids of from 20 to 60%, preferably from 25 to 55%, and with particular preference from 30 to 50%. For this procedure the organic solution may be stirred into (preferably preheated) water, or water may be stirred into the organic solution. It is also possible with preference to add part of the acid used for the neutralization, preferably from 20 to 80%, to the water used for dilution. The acids used for neutralization are preferably selected from boric acid, phosphoric acid, formic acid, acetic acid, lactic acid, citric acid, and tartaric acid. The epoxide compound A' is added slowly to the aqueous solution at a temperature of from 60 to 99° C., preferably from 70 to 97° C., and with particular preference from 75 to 95° C., and the reaction is conducted until all of the epoxide groups have been consumed.

The reaction products A'ABC are suitable for use as binders for preparing aqueous coating compositions which dry in air by oxidation. To this end, coating compositions comprising these binders are applied to the substrate by conventional techniques such as spraying, brushing, or dipping. The coatings protect the substrate against corrosive attack by acids, alkalis, salt solutions, and water. Accordingly, the reaction products of the invention are especially suitable for formulating anticorrosion primers for use on metal sheets or other surfaces of base metals (those above hydrogen in the voltage series), i.e., in particular for sheets of iron, galvanized iron, steel, aluminum, and aluminum alloys. Such coating compositions also include the customary additives such as defoamers, levelling agents, pigments, dispersants, antisettling agents, and thickeners.

The invention will be further illustrated by the following examples which are not intended to limit the scope of the invention as noted.

EXAMPLES

Example 1

Binder 1900 g of an epoxy resin based on bisphenol A, having a specific epoxide group content of 2.1 mol/kg ("epoxide equivalent weight" EEW=475 g/mol), were dissolved to give a 70% strength solution (70 g of solids in 100 g of the solution) in methoxypropanol as solvent containing 420 g of tall oil fatty acid (1.5 mol), 102 g of dimethylaminopropylamine (1 mol) and 53 g (0.5 mol) of diethanolamine, and this solution was reacted at 110° C. until all of the epoxide groups had been consumed.

Then 60 mmol of acetic acid were added per 100 g of resin solids, after which the mixture was diluted with fully deionized water to a mass fraction of solids (mass fraction of nonvolatile substances) of 40%.

250 g of bisphenol A diglycidyl ether were added to this aqueous solution over the course of 1 hour at 90° C. and the mixture was held at this temperature with stirring until epoxide groups were no longer detectable. Additional water was added for dilution to a mass fraction of solids of 38%.

Example 2

Primer

This binder was used to formulate a cationic primer, preparing a slurry of 62 g of an iron oxide pigment (®Bayferrox, Bayer A G), 106 g of a modified zinc phosphate (®Heucophos ZPO, Heubach), 55 g of a kaolin (®ASP 600, Engelhardt) and 55 g of a talc (®Talkum AT1, Norwegian Talc) in a mixture of 88 g of fully deionized water, 22 g of a commercial dispersant (®Additol VXW 6208, Solutia Austria GmbH) and 3 g of a commercial defoamer (®Surfynol SE-F, E. I. DuPont de Nemours) with the addition of 6 g of a thixotropic agent (®Luwothix HT, Lehmann & Voss) and 3 g of an acrylate thickener (®Acrysol RM 8/12 WA, Rohm & Haas). 480 g of the above binder solution in water were added to this slurry, and 3 g of a cobalt octoate siccative (as a 3% strength solution in water) and a further 117 g of water were added. The aqueous primer obtained had an efflux time (4 mm cup; DIN EN ISO 2431 or DIN 53 211) of approximately 30 s.

Comparative Examples (Examples 3 and 4)

For comparison, a primer 3 (Example 3) based on an aqueous emulsion of an oxidatively drying epoxy resin ester (®Duroxyn VEF 4380, Solutia Austria GmbH) and a conventional solventborne primer 4 (Example 4) based on a resin acid modified, medium oil alkyd resin (®Vialkyd AM 404, Solutia Austria GmbH) were employed. Their formulations can be seen from Table 1 below.

TABLE 1

Composition of the primers

| Ingredients | Producer | Function | Primer 2 (inventive) | Primer 3 (epoxy resin ester) | Primer 4 (conventional alkyd resin primer) |
|---|---|---|---|---|---|
| | | Binder | from Example 1 480 g | ®Duroxyn VEF 4380 883 g | ®Vialkyd AM 404 350 g |
| Water | | Diluent | 88 g | | |
| AMP 90 | Angus | Neutralizing agent | | 2 g | |
| ®Additol VXW 6208 | Solutia Austria GmbH | Dispersant | 22 g | 6 g | 10 g |
| ®Surfynol SE-F | E.I. DuPont de Nemours | Defoamer | 3 g | 3 g | |
| ®Bayferrox 140 | Bayer AG | Iron oxide pigment | 62 g | 88 g | 99 g |
| ®Heucopohos ZPO | Heubach | Zinc phosphate | 106 g | 100 g | 101 g |
| ®ASP 600 | Engelhardt | Kaolin | 55 g | 60 g | 60 g |
| ®Talcum AT1 | Norwegian Talc | Talc | 55 g | 60 g | 60 g |
| ®Luwothix HT | Lehmann & Voss | Antisettling agent | 6 g | 6 g | 10 g |

TABLE 1-continued

Composition of the primers

| Ingredients | Producer | Function | Primer 2 (inventive) | Primer 3 (epoxy resin ester) | Primer 4 (conventional alkyd resin primer) |
|---|---|---|---|---|---|
| ®Acrysol RM8/12 WA | Rohm & Haas | Thickener | 3 g | 10 g | |
| ®Additol XL 280 | Solutia Austria GmbH | Antisettling agent | | | 19 g |
| Co octoate 3% aqueous solution | | Siccative | 3 g | 6 g | |
| Water | | Diluent | 117 g | 76 g | |
| Xylene | | Diluent | | | 278 g |
| Paint | | | 1000 g | 1000 g | 1000 g |

These primers were applied to industrial iron sheets (untreated) in a dry film thickness of approximately 30 μm by spraying (spray viscosity measured as efflux time from a 4 mm cup in accordance with DIN EN ISO 2431: approximately 30 s). After a drying time of 10 days at room temperature, a corrosion test was conducted in accordance with DIN 50021. The results are summarized in Table 2:

TABLE 2

Results of the corrosion test

| Corrosion protection after exposure for | Primer 2 | Primer 3 (comparative) | Primer 4 (comparative) |
|---|---|---|---|
| 72 h | + | + | + |
| 144 h | + | 0 | + |
| 240 h | + | − | + |
| 400 h | + | | − |

The results were assessed as follows in accordance with the standard:

"very good": +; "adequate": 0; and "deficient": −.

In comparison with known aqueous primers based on oxidatively drying epoxy resin esters and known conventional (solventborne) primers based on alkyd resin, the corrosion protection effect is considerably more favorable.

What is claimed is:

1. A product A'ABC of reaction of epoxy resins, fatty acids, and amines, wherein it is a reaction product of epoxide compounds A' containing at least two epoxide groups per molecule and reaction products ABC of epoxide compounds A containing at least two epoxide groups per molecule, fatty acids B, and aliphatic amines C having from 2 to 12 carbon atoms, and wherein its number average molar mass $M_n$ is at least 5 000 g/mol, and, the epoxide compounds A' and/or the epoxide compounds A optionally having been modified prior to further reaction, in whole or in part, by reaction with compounds D containing at least one acid group or hydroxyl group reactive toward epoxide groups, and, the amines C optionally having been modified prior to further reaction, in whole or in part, by reaction with aliphatic or aromatic monoepoxide compounds A" or mixtures thereof.

2. The product as claimed in claim 1, wherein the epoxide compounds A' and the epoxide compounds A independently of one another are diepoxide or polyepoxide compounds having a specific epoxide group content of from 0.4 to 7 mol/kg.

3. The product as claimed in claim 1, wherein the epoxide compounds A have a specific epoxide group content of from 0.5 to 4 mol/kg.

4. The product as claimed in claim 1, wherein the epoxide compounds A' have a specific epoxide group content of from 2 to 5.9 mol/kg.

5. The product as claimed in claim 1, wherein the epoxide compounds A' and the epoxide compounds A independently of one another are epoxide compounds based on bisphenol A and/or epoxide compounds based on bisphenol F.

6. The product as claimed in claim 1, wherein the fatty acids B contain at least one olefinic double bond and have from 6 to 30 carbon atoms.

7. The product as claimed in claim 1, wherein the amines C are aliphatic linear, cyclic or branched amines which contain at least one primary or secondary amino group.

8. The product as claimed in claim 1, wherein the epoxide compounds A' and/or the epoxide compounds A, prior to further reaction, have been modified in whole or in part by reaction with compounds D which contain at least one acid group or hydroxyl group which is reactive toward epoxide groups.

9. The product as claimed in claim 8, wherein the compounds D are aromatic hydroxy compounds and/or saturated aliphatic linear or branched carboxylic acids having from 2 to 40 carbon atoms and/or sulfonic acids and/or phosphoric acid and/or alkyl- and arylphosphonic acids.

10. The product as claimed in claim 1, wherein the amines C, prior to further reaction, have been modified in whole or in part by reaction with aliphatic or aromatic monoepoxide compounds A" or mixtures thereof.

11. The product as claimed in claim 10, wherein the monoepoxide compounds A" are glycidyl ethers of monohydric alcohols or phenols and/or glycidyl esters of monobasic acids.

12. The product as claimed in claim 10, wherein the monoepoxide compounds A" are butyl glycidyl ether and/or 2-ethylhexyl glycidyl ether and/or glycidyl neopentanoate and/or glycidyl neodecanoate and/or glycidyl 2-ethylhexanoate.

13. A process for preparing the product as claimed in claim 1, which comprises in the first stage preparing an adduct ABC by reacting the epoxide compounds A containing at least two epoxide groups per molecule, the fatty acids B, and the aliphatic amines C having from 2 to 12 carbon atoms and in a second stage reacting said adduct with epoxide compounds A' containing at least two epoxide groups per molecule to give the reaction products A'ABC, the epoxide compounds A' and/or the epoxide compounds A have optionally having been modified prior to further reaction, in whole or in part, by reaction with compounds D containing at least one acid group or hydroxyl group reactive toward epoxide groups, and the amines C optionally having been modified prior to further reaction, in whole or in part, by reaction with aliphatic or aromatic monoepoxide compounds A" or mixtures thereof.

14. The process as claimed in claim 13, wherein the epoxide compounds A' are replaced in whole or in part by reaction products of epoxide compounds A' with compounds D.

15. The process as claimed in claim 13, wherein the epoxide compounds A are replaced in whole or in part by reaction products of epoxide compounds A with compounds D.

16. The process as claimed in claim 13, wherein the amines C are replaced in whole or in part by reaction products of amines C with monoepoxide compounds A".

17. An anticorrosion primer composition comprising a product as claimed in claim 1.

* * * * *